United States Patent [19]
Chen et al.

[11] Patent Number: 5,341,077
[45] Date of Patent: Aug. 23, 1994

[54] METHOD AND DEVICE FOR LIMITING ELECTRICAL CURRENT SUPPLIED TO THE MOTOR OF AN ELECTRIC VEHICLE

[75] Inventors: Tshaw-Chuang Chen; Hong-Shi Chang; Huan-Jen Yang; Yaw-Shih Shieh, all of Hsinchu Hsien, Taiwan

[73] Assignee: Industrial Technology Research Institute, Hsinchu, Taiwan

[21] Appl. No.: 12,889

[22] Filed: Feb. 3, 1993

[51] Int. Cl.[5] ............................................. H02H 7/04
[52] U.S. Cl. ...................................... 318/434; 361/25
[58] Field of Search ............... 318/432, 434, 471, 362, 318/366; 361/23, 24, 25-27, 31, 103; 388/811, 817, 903, 934

[56] References Cited

U.S. PATENT DOCUMENTS

| | | | |
|---|---|---|---|
| 3,673,538 | 6/1972 | Faxon | 361/103 X |
| 3,868,554 | 2/1975 | Konrad | 318/434 |
| 4,075,674 | 2/1978 | Squires et al. | 361/27 |
| 4,291,355 | 9/1991 | Dinger | 361/31 |
| 4,626,753 | 12/1986 | Letterman | 361/25 X |
| 4,901,181 | 2/1990 | Miyanaga et al. | 361/33 |
| 5,189,350 | 2/1993 | Mallett | 318/434 |

Primary Examiner—Jonathan Wysocki
Attorney, Agent, or Firm—W. Wayne Lianh

[57] ABSTRACT

A current limiting device to limit the maximum allowable electric current to be supplied to a motor in driving an electric vehicle. The current limiting device includes (a) a first thermal switch to prevent the power switching element of the motor from being abnormally overheated, (b) a second thermal switch to prevent the motor from being abnormally overheated, and (c) a brake switch. The three switches altogether and in association with a certain hysteresis band work to switch the limits of the electric current passing through the motor between two or more predetermined electric current values. Under normal operating conditions, the limit of the current is set at a high level which is associated with a hysteresis action, and when one of the thermal switches or the brake switch is actuated, the limit of the electric current is switched to a lower value which is still associated with a hysteresis action.

5 Claims, 3 Drawing Sheets

METHOD AND DEVICE FOR LIMITING ELECTRICAL CURRENT SUPPLIED TO THE MOTOR OF AN ELECTRIC VEHICLE

BACKGROUND OF THE INVENTION

The present invention relates to a method and a device for limiting the current supplied to the electrical motor of an electric vehicle which is driven by an electric motor. More particularly, this invention offers a new method for limiting the current supplied to the motor of an electric vehicle to prevent the motor from stopping during a switching operation by thermal switches of control unit or motor, when the motor temperature exceeds a predetermined level; or when motor is being operated in a braking mode, the present invention allows a reduced current to pass through the motor, through as a speed control signal is delivered to the control unit of the motor. According to the method of this invention, the electrical current supplied to the motor is reduced to a low level in multiple steps, when the motor is being overheated or operated in a braking mode.

Conventionally, the motor of an electric vehicle is controlled by a control circuit including a pulse width modulator, a DC/DC converter or an inverter having a switching element, a gate driver and a current limiter for limiting the current supplied to the motor. Generally, the current limiter operates in two ways:

(1) a current detector is provided to feed the motor current back to a controlled loop, and the voltage applied to the motor is adjusted by adjusting the output of the pulse width modulator to the inverter according to the detected feedback current. (2) a current detector is provided to detect the current supplied to the motor, and when the detected current exceeds a predetermined level, an "INHIBIT" signal is produced by the current limiter and sent to the pulse width modulator to cause the inverter to stop the supply of the voltage from the source to the motor, until the current supplied to the motor is reduced to the level lower than a predetermined value, the current limiter then dismisses the "INHIBIT" signal to the pulse width modulator to allow the inverter to resume the supply of voltage to the motor.

Generally, the control unit and motor include respectively a thermal switch which is activated, when the temperature exceeds a predetermined level, to cut off the supply of current to the motor to stop the operation of the motor. However, such a sudden stop of the motor is undesirable when the vehicle is on the road. Furthermore, the driving circuit of a conventional electrically driven vehicle is caused to become "disable" when the brake is applied, and therefore it does not provide adequate control at low speeds. The conventional methods also tend to allow the vehicle to slide down the slope when restarting the motor uphill from a stop. The vehicle will be better controlled if the supply of the current is maintained during the braking operation.

SUMMARY OF THE INVENTION

The present invention has been accomplished under the aforesaid circumstances. It is an object of the present invention to provide a method for limiting the current supplied to the motor of an electric vehicle which is operated by an electric motor, such that the current is reduced from a high level to a low level without stopping the operation of the motor of the vehicle when the motor is being overheated and a thermal switch on power switching element of a control unit of the motor is actuated. It is another object of the present invention to provide a method for limiting the current supplied to the motor of an electric vehicle which is operated by an electric motor.. such that the current is reduced from a high level to a low level without stopping the operation of the motor of the vehicle when the motor is being overheated and a thermal switch of the motor is actuated. It is still another object of the present invention to provide a method for limiting the current supplied to the motor of an electric vehicle which is operated by an electric motor, such that the current is reduced from a high level to a low level when the vehicle is in a braking operation so that an adequate control can be maintained at a low speed, and a "holding torque" is provided when the vehicle stops on a slope, to enable a smooth restarting on the slope without allowing the vehicle to slide down the slope. It is still another object of the present invention to provide a method for limiting the current supplied to the motor of an electric vehicle to reduce the current from a high level to a lower level and then to a further lower level in steps without stopping the motor when the motor is being overheated and the thermal switch on the power switching element of the control unit or the thermal switch of the motor is actuated, or when the brake is applied to the motor; and the level of the current is adjusted from a lower level to a higher level and then to an even higher level in several stages as the actuated thermal switch returns to its normal position or the operation of the vehicle is changed from the braking operation to a driving operation, It is still another object of the present invention to provide a hysteresis current limiting device for applying the aforesaid current limiting methods. In the present invention a hysteresis operation is employed rather than a plain limitation of current so that the power loss by heat at the switching element of the gate driver can be minimized.

According to the present invention, the current limiting method is a multi-stage hysteresis operation controlled by a thermal switch on the power switching elements of the control unit of a motor of the electric vehicle, the thermal switch or overload relay of the motor and a brake switch operable by the braking of the motor vehicle, to control the current in steps.

The present invention also provides a multi-stage hysteresis current limiting device for use with the multi-stage hysteresis current limiting method of the present invention, the device comprising a low pass amplifier, which removes high frequency noises from the current and voltage detected signal obtained from a DC bus or a motor by means of a current detector, amplifies the filtrated current and voltage and then sends the amplified current and voltage signal to a gain switching amplifier, which is controlled by the thermal switch on the power switching element of the control unit of the motor, the thermal switch or overload relay of the motor and a brake switch of the vehicle to select different current gains. The multi-stage hysteresis current limiting method also includes a hysteresis level detector, which detects the range of the upper current limit value and lower current limit value at each step of the multi-stage hysteresis current limiting operation.

DETAILED DESCRIPTION OF THE DRAWINGS

Figure 1:
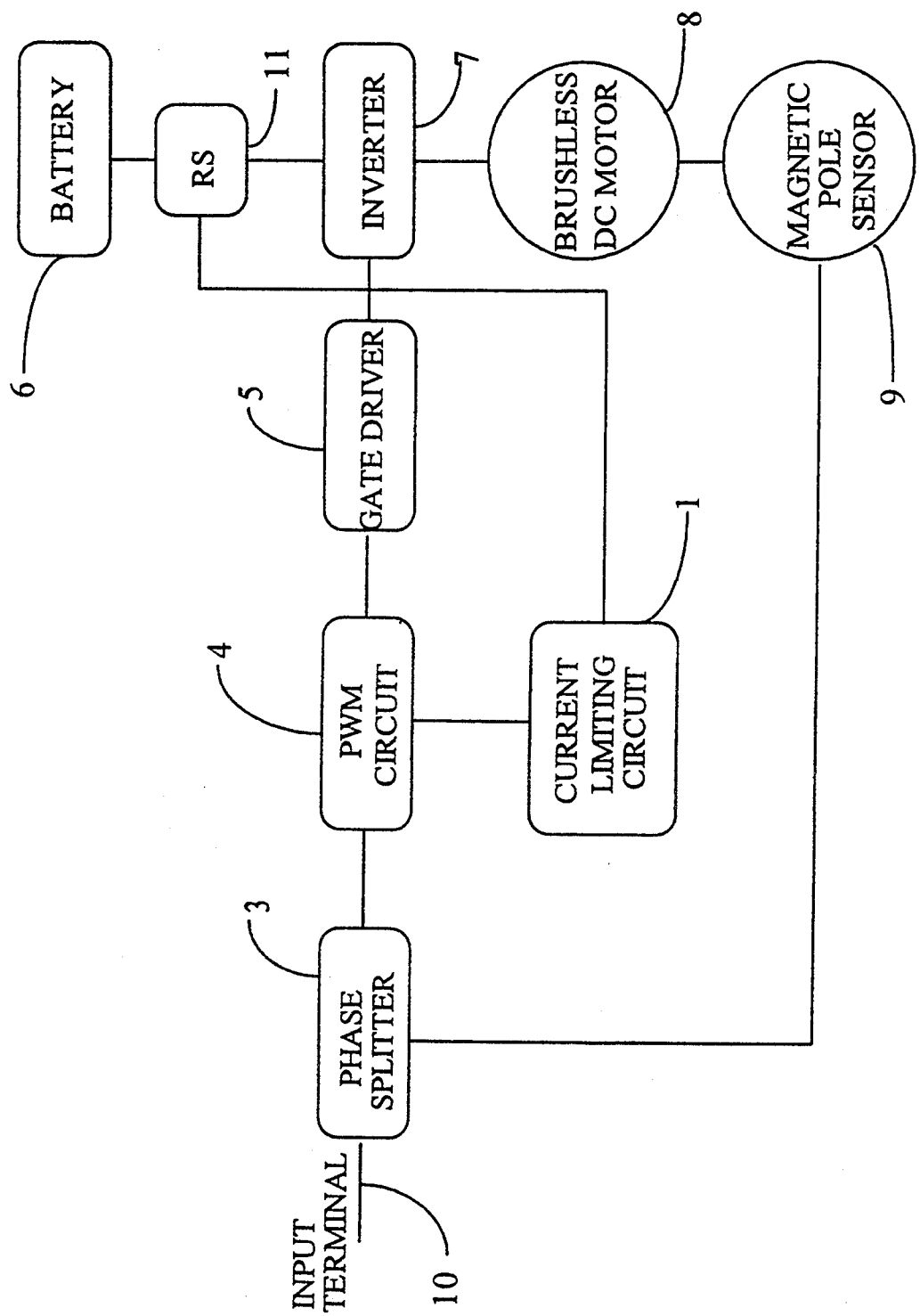
FIG. 1 is a block diagram showing an open-loop brushless DC motor control circuit in which the current limiting device of the present invention is employed.

Referring to FIG. 1, therein illustrated is an open-loop brushless DC motor control unit which includes a phase splitter 3, a PWM (pulse width modulation) circuit 4 connected to phase splitter 3, a gate driver 5 which receives an out put from PWM circuit 4, a multi-stage hysteresis current limiting circuit 1 (hereafter as a current limiter) connecting to PWM 4 and current detector or shunt RS 2 for detecting DC bus current signal, an inverter 7 connected to gate driver 5 and current detector or shunt RS 2, a brushless DC motor 8 connected to inverter 7, and a magnetic pole sensor 9. A speed command signal through input terminal 10 to the phase splitter 3. The voltage supplied to current limiter 1 through shunt RS 2 is amplified and filtrated by a low pass amplifier (to be described later) to provide a voltage for performing the control function of limiting the current supplied to the motor 8. As the current limit function works, the current limiter 1 sends an inhibit output signal to the PWM circuit 4, thereby causing the inverter 7 to stop sending an voltage to the brushless DC motor 8, and therefore the current which passes through the brushless DC motor 8 is maintained below the predetermined level.

Figure 2:
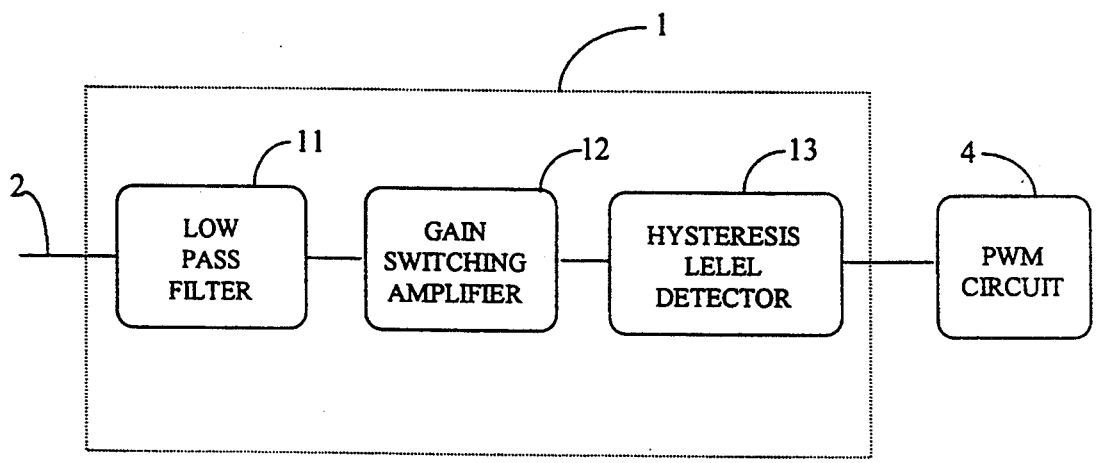
FIG. 2 is a block diagram of a multi-stage hysteresis current limiting circuit according to the present invention.

Referring to FIG. 2, therein illustrated is a block diagram of the current limiter 1, which includes a low pass amplifier circuit 11, a gain switching amplifier circuit 12, and a hysteresis level detector circuit 13.

Figure 3:
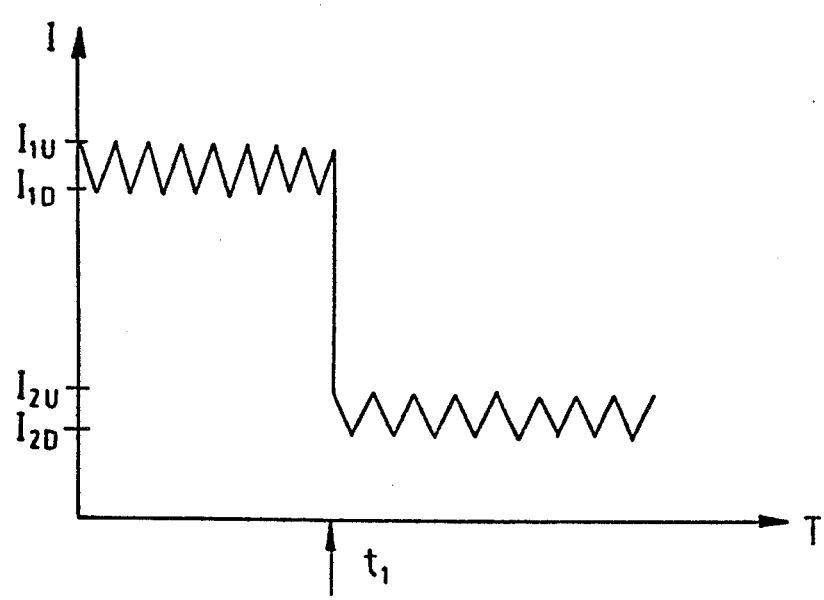
FIG. 3 shows two current limit ranges in a two-stage hysteresis current limit operation according to the present invention.

Referring to FIG. 3, therein illustrated is a two-stage hysteresis current limiting operation according to the present invention. At the first stage of the current limiting operation, the maximum allowable current level is set at the range of $I_{1U}$–$I_{1D}$, which range is approximately equal to the current needed for the maximum torque of the output of the brushless DC motor: such current is about three times the rated current of the brushless DC motor. Normally, the motor is allowed to operate at such maximum allowable current level only for a short period time. Current limiter 1 is so set that the first stage current limiting operation is performed until the thermal switch on the power switching element of control unit or the thermal switch of brushless motor 8 is activated because of excessive heat generated by motor having been operating at the maximum current. Then current limiter 1 is caused to perform the second stage of the current limiting operation.

In the second stage, the current is limited to the range $I_{2U}$–$I_{2D}$, as shown in FIG. 3, which current is approximately equal to 0.8 times the rated current of the brushless DC motor. During the operation of the second stage, the temperature of the motor will be sufficiently low to keep the power switching element of the control unit and the thermal switch of the brushless DC motor inactivated so as to maintain the normal operation of the control unit and the brushless DC motor. In the drawing, $t_1$ is the current limit switching point.

In order to keep the vehicle, which may be a electric-motorcycle, operating normally, the current, which passes through the motor of the vehicle, is limited to 0.8 times that of the rated current of the motor when the brake of the motorcycle is applied. In this two-stage hysteresis current limiting procedure, a brake switch, which is actuated when the brake is applied, the related thermal switches are connected in applied, the related thermal switches are connected in series for controlling the switching of the current level to be limited.

Figure 4:
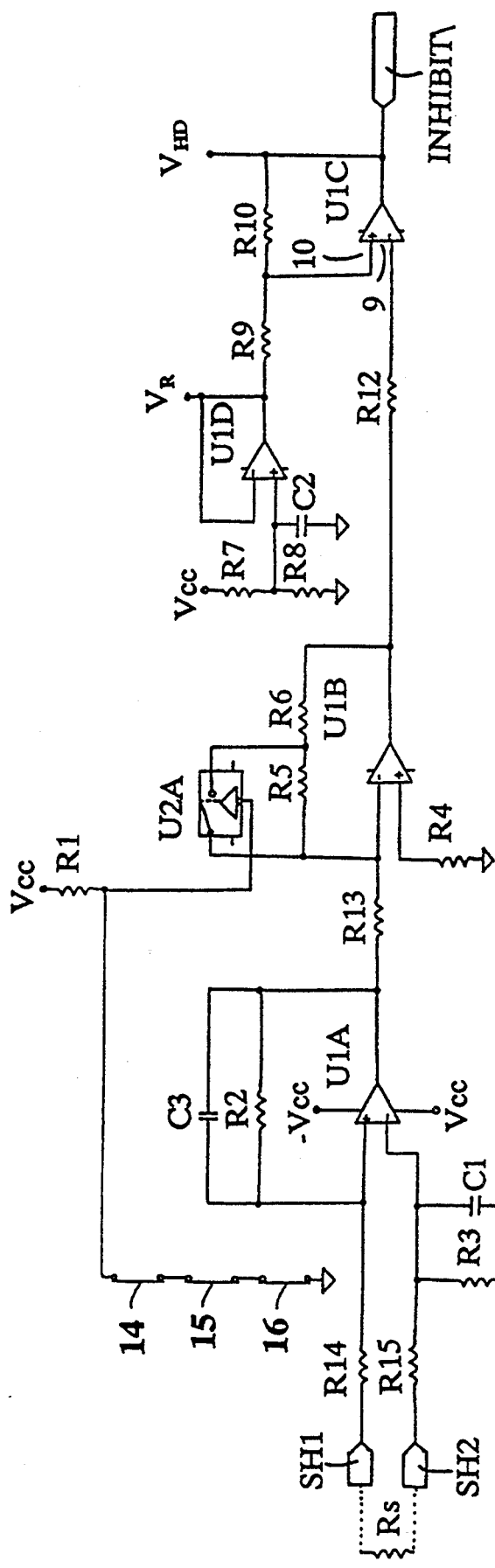
FIG. 4 is a circuit diagram of a two-stage hysteresis current limiting circuit according to the present invention.

Referring to FIG. 4, therein illustrated is a circuit diagram of a current limiting circuit according to the present invention, in which the thermal switch on the power switching element of the control unit is indicated at 14; the thermal switch of the motor is indicated at 15; the brake switch indicated at 16. The voltage obtained by the shunt RS is inputted through the terminals of SH1 and SH2, and then supplied through the differential amplifier of U1A, wherein R2=R3; R14=R15; C1=C3; the gain is R2/R14; the low pass filter cut-off frequency is:

$$fc = \frac{1}{2\pi\, R2C3};$$

and U1B is an inverter amplifier. This circuit is designed for two-stage current limit control. Thermal switches 14, 15 and the brake switch 16 are normally closed when the temperature at the power switching element of the control unit is below 85° C. or the temperature at the motor is below 135° C. At this stage, analog switch U2A is short-circuited, and the gain is R6/R13. When either switch 14 or 15 is caused to open because of excessive heat, or brake switch is caused to open as the brake is applied, the gain becomes (R5+R6)/R13.

U1C is a non-inversion hysteresis level detector. U1D is a buffer.

$$\text{if: } Z1 = \frac{R10}{R9 + R10}, Z2 = \frac{R9}{R9 + R10}$$

$$V_R = \frac{R8}{R7 + R8} \times VCC$$

When the voltage at input terminal 10 of U1C is higher than the voltage at terminal 9, $V_{HD}$=VCC; when the voltage at input terminal 10 of U1C is lower than the voltage at terminal 9, $V_{HD}$=−VCC, wherein VCC and −VCC are voltages of power source $V_{HD}$.—

Thus, the current limiting range at the first stage of the current limiting operation can be calculated as follows:

$$I = \frac{R13}{R6} \times \frac{R14}{R2 \times RS} \times (Z1 \times V_R + Z2 \times V_{HD})$$

when $V_{HD} = VCC$, then $I = I_{1U}$; and
when $V_{HD} = -VCC$, then $I = I_{1D}$.

And, the current limiting range at the second stage of the current limiting operation can be calculated as follows:

$$I = \frac{R13}{R5 + R6} \times \frac{R14}{R2 \times RS} \times (Z1 \times V_R + Z2 \times V_{HD})$$

when $V_{HD} = VCC$, then $I = I_{2U}$; and
when $V_{HD} = -VCC$, then $I = I_{2D}$.

According to the aforementioned four equations, respective resistance values can be selected to achieve the two-stage hysteresis current limiting operations, and the high or low current limiting value is controlled by switching the thermal switch 14 of the power switching element of the control unit motor, the thermal switch 15 of the motor, or brake switch 16.

When the current limiting function is under operation, INHIBIT/ is at low level, and an inhibit output signal is sent to the PWM circuit causing the inverter to stop sending a voltage to the motor.

In the above described embodiment, the maximum allowable current range $I_{1U}$–$I_{1D}$ is set at about 3 times of the rated current $I_R$, therefore the range of $I_{2U}$–$I_{2D}$ is $3I_R \times 10/(27+10) = 0.81\ I_R$.

The two-stage current limiting circuit can be turned into a multi-stage hysteresis current limiting circuit by changing the two-stage design of the inverter amplifier U1B into a multi-stage gain switching amplifier circuit.

As indicated, the current of the control unit is limited at a high level under normal conditions so that the motor is provided with the maximum output current and enabled to produce the maximum torque output. when the thermal switch of the power switching element of the control unit or the motor, or the brake switch is actuated, the level of the current passing through the motor is gradually reduced to a lower level in several stages. Once the thermal switch on the power switching element of the control unit or the motor has returned to its former position or the brake switch remains closed, the level of the current to be limited is then raised in several stages.

The present invention can also be applied to a DC brush motor having an overload relay, or AC motors.

While only an embodiment of the present invention has been shown and described, it will be understood that various changes and modification could be made thereunto without departing from the spirit and scope of the invention as defined in the appended claims.

What is claimed is:

1. A method for limiting electrical current passing through an electric motor which is used in driving an electrical vehicle, said method comprising the steps of:
   obtaining a current limiting apparatus, said current limiting apparatus containing a gate driver which contains a first thermal switch connected to a power switching element, a second thermal switch connected to said motor, and a brake switch,
   setting a high and at least a first and a second lower allowable current limits for said current limiting apparatus, said first lower current limit being higher than second lower current limit but lower than said high current limit, whereby said current limit initially will be set at said high level, each of said current limits is set according to a hysteresis operation of said electric motor;
   shifting said current limit to said first lower level when either said first thermal switch or said second thermal switch is actuated due to overheating, or when said braking switch is actuated when a brake is applied;
   further shifting said current limit to said second lower level when said overheating presists; and
   shifting said current limit from a lower level to a higher level as soon as said power switching element, said motor and said brake switch are in an normal state.

2. The method for limiting electrical current passing through an electric motor according to claim 1 wherein said current limiting apparatus comprising:
   a low pass amplifier for amplifying a first electrical signal corresponding to the current supplied to said electric motor from a power source and removing noise from said first electrical signal and producing a second electrical signal;
   a plurality of thermal switches operable at various temperature levels to produce a thermal signal;
   a brake switch operable in association with a brake device of said vehicle to produce a braking signal;
   a gain switching amplifier for receiving said second electrical signal, said thermal signal and said braking signal to determine a gain and produce a current limiting signal representing a current limit;
   a hysteresis level detector for detecting the level of a hysteresis of said electric motor at each level of the current supplied to said electric motor, and producing a range signal to define a range of said current limit; and
   a pulse width modulator for controlling the level of current supplied to said electric motor according to said current limiting signal and said range signal.

3. The method for limiting electrical current passing through an electric motor according to claim 1 wherein said first lower level is no greater than 50% of of said high level.

4. The method for limiting electrical current passing through an electric motor according to claim 1 wherein said first thermal switch, said second thermal switch, and said brake switch are connected in series.

5. A current limiting apparatus for limiting electrical current passing through an electric motor comprising:
   a low pass amplifier for amplifying a first electrical signal corresponding to the current supplied to said electric motor from a power source and removing noise from said first electrical signal and producing a second electrical signal;
   a plurality of thermal switches operable at various temperature levels to produce a thermal signal;
   a brake switch operable in association with a brake device of said vehicle to produce a braking signal;
   a gain switching amplifier for receiving said second electrical signal; said thermal signal and said braking signal to determine a gain and produce a current limiting signal representing a current limit;
   a hysteresis level detector for detecting the level of a hysteresis of said electric motor at each level of the current supplied to said electric motor, and producing a range signal to define a range of said current limit; and
   a pulse width modulator for controlling the level of current supplied to said electric motor according to said current limiting signal and said range signal.

* * * * *